(12) United States Patent
Taniguchi et al.

(10) Patent No.: US 8,893,575 B2
(45) Date of Patent: Nov. 25, 2014

(54) CAULKING-FASTENED COMPONENT, METHOD OF FASTENING THE CAULKING-FASTENED COMPONENT, AND METHOD OF MANUFACTURING THE CAULKING-FASTENED COMPONENT

(75) Inventors: Makoto Taniguchi, Susono (JP); Yuki Kurosaki, Susono (JP); Yoshihiko Ukai, Nagoya (JP); Jun Kamitake, Toyota (JP); Jo Kayahana, Okazaki (JP); Shuhei Yamaguchi, Kariya (JP); Katsuaki Makino, Hazu-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 87 days.

(21) Appl. No.: 13/519,198

(22) PCT Filed: Jun. 8, 2011

(86) PCT No.: PCT/JP2011/063157
§ 371 (c)(1),
(2), (4) Date: Jun. 26, 2012

(87) PCT Pub. No.: WO2012/169024
PCT Pub. Date: Dec. 13, 2012

(65) Prior Publication Data
US 2012/0311845 A1 Dec. 13, 2012

(51) Int. Cl.
*B21D 39/00* (2006.01)
*B21K 25/00* (2006.01)
*B23P 11/00* (2006.01)
*F16H 55/17* (2006.01)

(52) U.S. Cl.
CPC ............... *B23P 11/005* (2013.01); *F16H 55/17* (2013.01); *B21K 25/00* (2013.01)
USPC .................. 74/434; 29/893; 29/893.2; 29/505

(58) Field of Classification Search
CPC ............ F16H 57/023; F16H 2048/382; F16H 2048/385; F16H 48/40; F16H 2045/021; F16H 2045/0284; F16H 2045/0294; F16H 45/02; F16H 55/17; F16H 2048/106; F16H 21/18; F16H 48/08; F16H 48/10; F16H 48/11
USPC ............................................... 74/434; 29/505
See application file for complete search history.

(56) References Cited

FOREIGN PATENT DOCUMENTS

| EP | 0 647 789 A1 | 4/1995 | |
| EP | 0647789 B1 * | 4/1995 | .............. F16D 1/072 |

(Continued)

OTHER PUBLICATIONS

International Search Report of PCT/JP2011/063157 mailed Jul. 12, 2011.

*Primary Examiner* — David Bryant
*Assistant Examiner* — Ruth G Hidalgo-Hernande
(74) *Attorney, Agent, or Firm* — Kenyon & Kenyon LLP

(57) ABSTRACT

An annular caulking-fastened component to be fastened to a counterpart component by caulking includes a notch formed in an inner peripheral edge portion at one end side in a center axis direction, the notch being to be fixed to the counterpart component by caulking; and at least one of an inner-peripheral stepped portion formed between an inner peripheral surface and the inner peripheral edge portion and outward from the inner peripheral surface in a radial direction and an end-face stepped portion formed between an end face at one end side in the center axis direction and the inner peripheral edge portion and from the end face toward the other end side in the center axis direction.

4 Claims, 10 Drawing Sheets

(56) References Cited

FOREIGN PATENT DOCUMENTS

| | | |
|---|---|---|
| FR | 2 580 349 A1 | 10/1986 |
| JP | 2-31630 U | 2/1990 |
| JP | 2000-274494 A | 10/2000 |
| JP | 2003-294114 A | 10/2003 |
| JP | 2008-185139 A | 8/2008 |
| JP | 2010-031913 A | 2/2010 |
| JP | 2010-071372 A | 4/2010 |
| WO | 2011/145189 A1 | 11/2011 |

\* cited by examiner

CAULKING-FASTENED COMPONENT, METHOD OF FASTENING THE CAULKING-FASTENED COMPONENT, AND METHOD OF MANUFACTURING THE CAULKING-FASTENED COMPONENT

CROSS-REFERENCE TO RELATED APPLICATIONS

This is a 371 national phase application of PCT/JP2011/063157 filed on 8 Jun. 2011, the entire contents of which are incorporated herein by reference.

TECHNICAL FIELD

The present invention relates to a caulking-fastened component of a fastening structure fastened by caulking, a method of fastening the caulking-fastened component, and a method of manufacturing the caulking-fastened component.

BACKGROUND ART

For instance, in a differential sub-assembly mounted in a vehicle, a differential case and a ring gear are fastened to each other. Herein, fastening of such two components is disclosed in Patent Document 1 disclosing a method of manufacturing a ring gear to be used in a planetary gear structure or the like, in which a gear body subjected to knurling is fastened to an inner peripheral part of a housing by press-fitting.

RELATED ART DOCUMENTS

Patent Documents

Patent Document 1: JP2000-274494A

DISCLOSURE OF THE INVENTION

Problems to be Solved by the Invention

In Patent Document 1, the gear body is press-fitted and fastened in the housing. Further, it is conceivable to fasten the two components by caulking in addition to fastening by press-fitting in order to further reinforce retaining of the components against vibrations or other influences.

For example, the differential sub-assembly is exemplified below. Firstly, a plurality of recessed notches are formed in an inner peripheral edge portion of one of end portions of a ring gear in a center axis direction and arranged at intervals in a circumferential direction of the ring gear. The ring gear is press-fitted on a flange of a differential case and then the flange is pressed to be widened from inside to outside in a radial direction of the ring gear by plastic deformation processing, thereby fastening the ring gear to the flange of the differential case by caulking.

Herein, when the notches are to be formed in the ring gear, a ring-shaped unprocessed material 100 as shown in FIG. 9 is subjected to press working to form notches 104 as shown in FIG. 11 in an inner peripheral edge portion 102 shown in FIG. 10 (an enlarged view of a part C in FIG. 9). However, when the notches 104 are formed by press working, a constituent material of the unprocessed material 100 is apt to protrude or undulate around the notches 104 as shown in FIG. 11. For this reason, protrusions 110 are formed on an inner peripheral surface 106 of the unprocessed material 100 and an end face 108 at one end side of the unprocessed material 100 in its center axis direction.

Herein, the inner peripheral surface 106 of the unprocessed material 100 is a surface serving as a press-fitting surface of the ring gear with respect to the flange of the differential case. The end face 108 of the unprocessed material 100 is a surface of the ring gear with which the flange of the differential case subjected to the deformation processing can contact. It is therefore necessary to remove the protrusions 110 from the press-fitting surface 106 and the end face 108 of the unprocessed material 100 by cutting. This results in an increase in the number of processes required to fasten the ring gear to the flange of the differential case, leading to an increased cost.

Since the notches 104 are formed at intervals in the circumferential direction of the unprocessed material 100, the protrusions 110 are similarly formed at intervals in the circumferential direction of the unprocessed material 100. Thus, when the press-fitting surface 106 and the end face 108 are to be subjected to cutting in the circumferential direction of the unprocessed material 100, the cutting has to be intermittently conducted. Such intermittent cutting is apt to cause burrs around each notch 104. After the cutting to the press-fitting surface 106 and the end face 108, accordingly, it is further necessary to perform a process of removing the burrs formed around each notch 104. Further, if such a removing work is conducted on each of the notches 104, this work may impose a large burden. This consequently results in the increased number of processes required to fasten the ring gear to the flange of the differential case and hence the largely increased cost.

The present invention has a purpose to provide a caulking-fastened component, a method of fastening the caulking-fastened component, and a method of manufacturing the caulking-fastened component, whereby a manufacturing cost for a fastening structure of the caulking-fastened component and a counterpart component (a component of the other party) can be reduced.

Means of Solving the Problems

To achieve the above purpose, one aspect of the invention provides an annular caulking-fastened component to be fastened to a counterpart component, the caulking-fastened component including: a notch formed in an inner peripheral edge portion at one end side in a center axis direction, the notch being to be caulked to the counterpart component by caulking; and at least one of an inner-peripheral stepped portion formed between an inner peripheral surface and the inner peripheral edge portion and outward from the inner peripheral surface in a radial direction and an end-face stepped portion formed between an end face at one end side in the center axis direction and the inner peripheral edge portion and from the end face toward the other end side in the center axis direction.

According to the above aspect, the caulking-fastened component includes at least one of the inner-peripheral stepped portion formed between the inner peripheral surface and the inner peripheral edge portion at one end side in the center axis direction and outward from the inner peripheral surface in the radial direction, and, the end-face stepped portion formed between the end face at the one end side in the center axis direction and the inner peripheral edge portion and from the end face to the other end side in the center axis direction. Accordingly, the protrusion formed when a constituent material of the unprocessed material is pushed out around the notch when the notch is formed in the inner peripheral edge portion is less likely to have an influence on a counterpart component to which the caulking-fastened component is fastened. The number of processes required to remove the protrusion can be reduced, thus resulting in a reduced manufacturing cost of the caulking-fastened component. Consequently, a manufacturing cost of a fastening structure between the caulking-fastened component and the counterpart component can also be reduced. Further, the presence of the inner-peripheral stepped portion enables reduction of variations in load from product to product among caulking-fastened components when the caulking-fastened components are to be press-fitted (inserted) in counterpart components.

In the above caulking-fastened component, preferably, a protrusion is a raised portion formed when a constituent material of an unprocessed material is pushed out around the notch when the notch is formed, the protrusion being apart from at least one of the inner peripheral surface and the end face, for having the protrusion away from the inner peripheral surface, the protrusion is formed apart from the inner peripheral surface in the center axis direction, and for having the protrusion away from the end face, the protrusion is formed apart from the end face in the radial direction.

According to this configuration, the protrusion formed around the notch when the notch is formed is located apart from at least one of the inner peripheral surface and the end face at the one end side. For having the protrusion away from the inner peripheral surface, the protrusion is formed apart from the inner peripheral surface in the center axis direction. For having the protrusion away from the end face at the one end side, the protrusion is formed apart from the end face at the one end side in the radial direction. Accordingly, there is no need for the process of removing the protrusion from at least one of the inner peripheral surface and the end face at the one end side. Thus, in case the inner peripheral surface and the end face of the caulking-fastened component are subjected to cutting using a cutting tool in order to enhance the accuracy of the inner peripheral surface and the end face, the service life of the cutting tool can be increased. Further, the manufacturing cost of the caulking-fastened component can be effectively reduced.

In the above caulking-fastened component, preferably, a step amount of the inner-peripheral stepped portion and a step amount of the end-face stepped portion are each determined to be larger than height of the protrusion.

According to this configuration, the step amount of the inner-peripheral stepped portion and the step amount of the end-face stepped portion are determined to be larger than the height of the protrusion. Therefore, the protrusion does not have an influence on the counterpart component when the caulking-fastened component is fastened to the counterpart component. For this reason, the fastening strength of the fastening structure between the caulking-fastened component and the counterpart component can be enhanced.

In the above caulking-fastened component, preferably, the counterpart component is a differential case of a differential device, and the caulking-fastened component is a ring gear to be fastened to the differential case.

According to this configuration, it is possible to reduce the manufacturing cost required for fastening between the ring gear and the differential case in the differential device.

To achieve the above purpose, another aspect of the invention provides a method of fastening an annular caulking-fastened component to a counterpart component by caulking, wherein the caulking-fastened component includes: a notch formed in an inner peripheral edge portion at one end side in a center axis direction, the notch being to be caulked to the counterpart component by caulking; and at least one of an inner-peripheral stepped portion formed between an inner peripheral surface and the inner peripheral edge portion and outward from the inner peripheral surface in a radial direction and an end-face stepped portion formed between an end face at one end side in the center axis direction and the inner peripheral edge portion and from the end face toward the other end side in the center axis direction, and the method includes: placing the counterpart component inside the inner peripheral surface of the caulking-fastened component, and pressing a caulking portion of the counterpart component against the notch by deforming the caulking portion outward in the radial direction of the caulking-fastened component.

According to this aspect, the caulking-fastened component includes at least one of the inner-peripheral stepped portion formed between the inner peripheral surface and the inner peripheral edge portion at the one end side in the center axis direction and outward from the inner peripheral surface in the radial direction and the end-face stepped portion formed between the end face at one end side in the center axis direction and the inner peripheral edge portion and from the end face toward the other end side in the center axis direction. With this configuration, the protrusion formed around the notch by the constituent material of the unprocessed material pushed out when the notch is formed in the inner peripheral edge portion is less likely to have an influence on the counterpart component to which the caulking-fastened component is fastened. Accordingly, the number of processes required to remove the protrusion can be reduced, thereby achieving a reduction in manufacturing cost of the caulking-fastened component. This can reduce the manufacturing cost of the fastening structure between the caulking-fastened component and the counterpart component. Because of the presence of the inner-peripheral stepped portion, it is possible to reduce variations in load from product to product among the caulking-fastened components when the caulking-fastened components are press-fitted (inserted) in the counterpart components.

In the above method of fastening a caulking-fastened component, preferably, a method of fastening an annular caulking-fastened component to a counterpart component by caulking, wherein the caulking-fastened component includes: a notch formed in an inner peripheral edge portion at one end side in a center axis direction, the notch being to be caulked to the counterpart component by caulking; and at least one of an inner-peripheral stepped portion formed between an inner peripheral surface and the inner peripheral edge portion and outward from the inner peripheral surface in a radial direction and an end-face stepped portion formed between an end face at one end side in the center axis direction and the inner peripheral edge portion and from the end face toward the other end side in the center axis direction, and the method includes: placing the counterpart component inside the inner peripheral surface of the caulking-fastened component, and pressing a caulking portion of the counterpart component against the notch by deforming the caulking portion outward in the radial direction of the caulking-fastened component.

According to this configuration, the protrusion formed around the notch when the notch is formed is apart from at least one of the inner peripheral surface and the end face at one end side. For having the protrusion away from the inner peripheral surface, the protrusion is formed apart from the inner peripheral surface in the center axis direction. For having the protrusion away from the end face at one end side, on the other hand, the protrusion is formed apart from the end face at the one end side in the radial direction. Thus, there is no need for the process of removing the protrusion at least one of the inner peripheral surface and the end face at the one end side. Therefore, in case the inner peripheral surface and the end face of the caulking-fastened component are subjected to cutting using a cutting tool in order to enhance the accuracy of the inner peripheral surface and the end face, the service life of the cutting tool can be increased. Further, the manufacturing cost of the caulking-fastened component can be effectively reduced.

In the above method of fastening a caulking-fastened component, preferably, a step amount of the inner-peripheral stepped portion and a step amount of the end-face stepped portion are each determined to be larger than height of the protrusion.

According to this configuration, the step amount of the inner-peripheral stepped portion and the step amount of the end-face stepped portion are determined to be larger than the height of the protrusion. Thus, the protrusion does not have an influence on the counterpart component when the caulking-fastened component is fastened to the counterpart component. For this reason, the fastening strength of the fastening structure between the caulking-fastened component and the counterpart component can be enhanced.

In the above method of fastening a caulking-fastened component, preferably, the counterpart component is a differential case of a differential device, and the caulking-fastened component is a ring gear to be fastened to the differential case.

According to this configuration, it is possible to reduce the manufacturing cost required for fastening between the ring gear and the differential case in the differential device.

To achieve the above purpose, another aspect of the invention provides a method of manufacturing an annular caulking-fastened component to be fastened to a counterpart component by caulking, the method including: an unprocessed material forming step of forming at least one of an inner-peripheral stepped portion between an inner peripheral surface of an annular unprocessed material and an inner peripheral edge portion at one end side in a center axis direction of the unprocessed material and outward from the inner peripheral surface in the radial direction of the unprocessed material and an end-face stepped portion between an end face at one end side in the center axis direction of the unprocessed material and the inner peripheral edge portion and from the end face toward the other end side in the center axis direction; and a notch forming step of forming a notch in the inner peripheral edge portion of the unprocessed material, the notch being to be fastened to the counterpart component by caulking.

According to this configuration, the annular unprocessed material includes at least one of the inner-peripheral stepped portion formed between the inner peripheral surface and the inner peripheral edge portion at the one end side in the center axis direction and outward from the inner peripheral surface in the radial direction and the end-face stepped portion formed between the end face at one end side in the center axis direction and the inner peripheral edge portion and from the end face toward the other end side in the center axis direction. Accordingly, the protrusion formed around the notch when a constituent material of the unprocessed material is pushed out when the notch is formed in the inner peripheral edge portion is less likely to have an influence on the counterpart component to which the caulking-fastened component is fastened. The number of processes required to remove the protrusion can be reduced, thus resulting in a reduced manufacturing cost of the caulking-fastened component. Consequently, a manufacturing cost of a fastening structure between the caulking-fastened component and the counterpart component can be reduced. Because of the presence of the inner-peripheral stepped portion, furthermore, it is possible to reduce variations in load from product to product among the caulking-fastened components when the caulking-fastened component is press-fitted (inserted) in the counterpart component.

Effects of the Invention

According to the caulking-fastened component, the method of fastening the caulking-fastened component, and the method of manufacturing the caulking-fastened component of the present invention, it is possible to reduce a manufacturing cost of a fastening structure of the caulking-fastened component and a counterpart component.

MODE FOR CARRYING OUT THE INVENTION

A detailed description of a preferred embodiment of the present invention will now be given referring to the accompanying drawings. The following explanation shows one example of a fastening structure between a differential case and a ring gear, which are constituent components of a differential sub-assembly (a differential device) of a vehicle such as a car.

<Brief Description of Differential Sub-Assembly>

Figure 1:
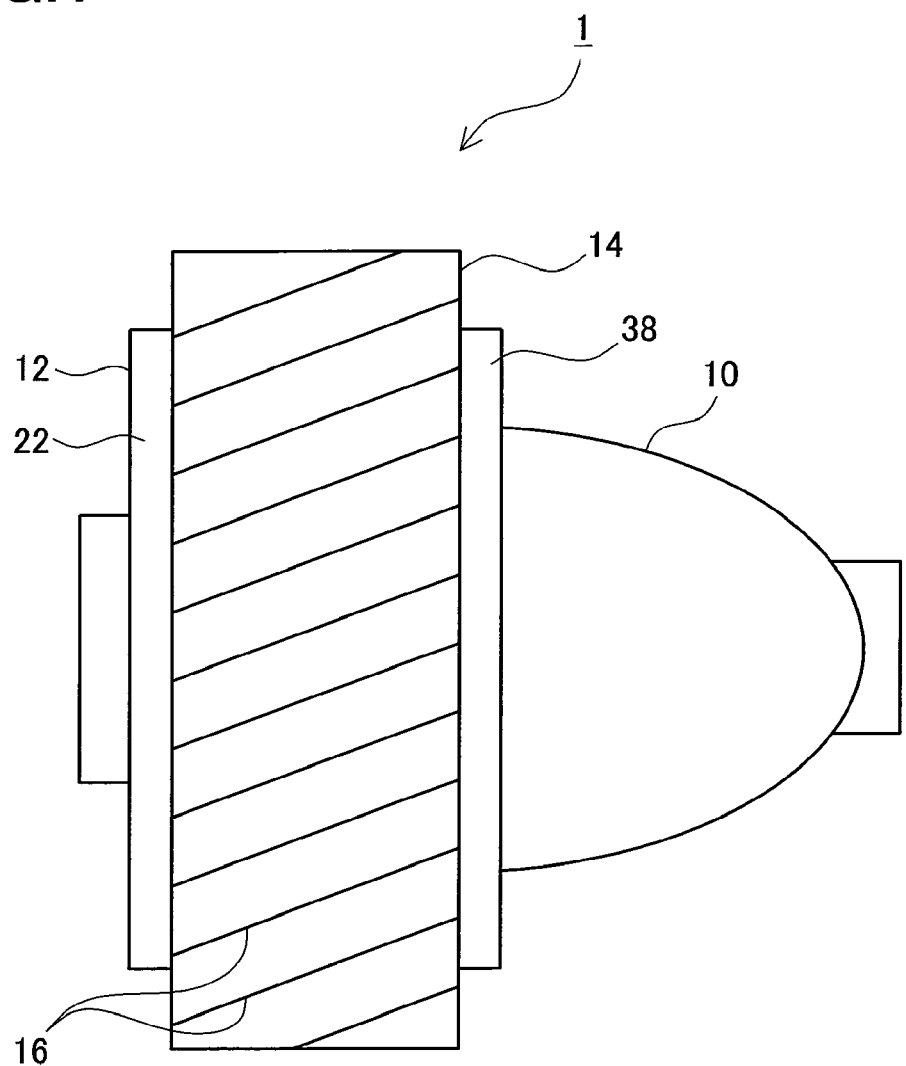
FIG. 1 is a side view of a differential sub-assembly.
Figure 2:
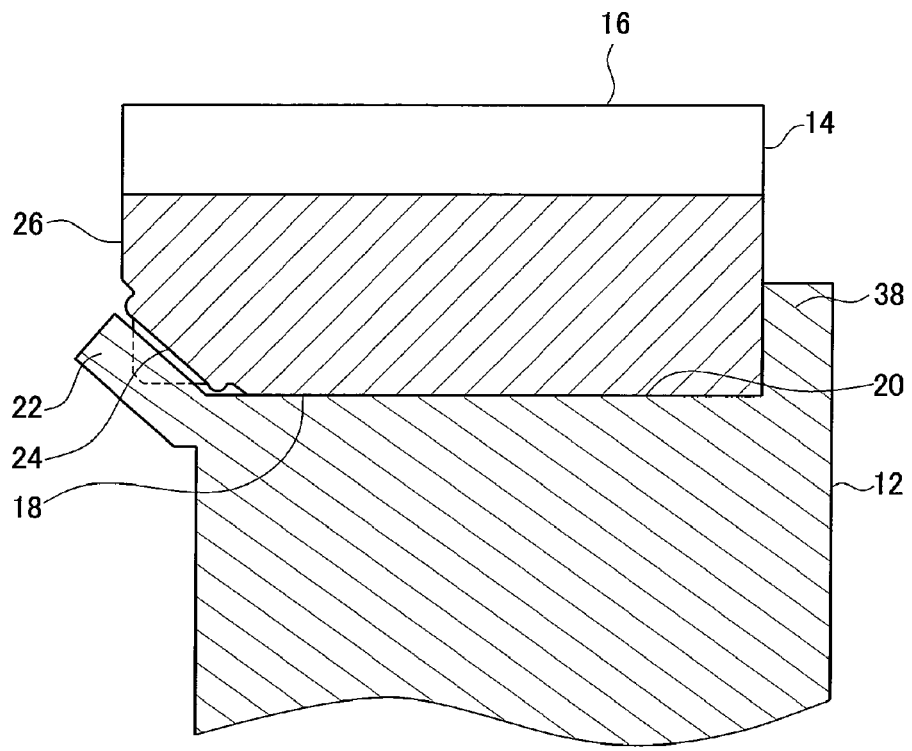
FIG. 2 is an enlarged sectional view of fastened portions of a flange of a differential case and a ring gear.

FIG. 1 is a side view showing a schematic structure of a differential sub-assembly. FIG. 2 is an enlarged sectional view of fastened portions of a flange 12 of a differential case 10 and a ring gear 14. As shown in FIG. 1, the differential sub-assembly 1 includes the differential case 10, the flange 12 provided on an outer periphery of the differential case 10 at one end side (a left side in FIG. 1), and the annular ring gear 14 fastened to an outer periphery of the flange 12. Inside the differential case 10, a pair of side gears (not shown) and a pair of pinions (not shown) are placed as being rotatably supported. The differential sub-assembly 1 is one example of a "differential device" of the invention, the differential case 10 is one example of a "counterpart component" of the invention, and the ring gear 14 is one example of a "caulking-fastened component" of the invention.

This differential sub-assembly 1 is used in a power transmission mechanism of a vehicle. In the vehicle, for instance, the differential sub-assembly 1 is provided in a change gear, a transfer, a final reduction gear, and others. The differential sub-assembly 1 transmits the power input from a counterpart gear (not shown) to the ring gear 14, to a rotary member (not shown) coupled to the pair of pinions while permitting a rotation difference between the pair of side gears. The rotary member includes for example a pair of right and left drive wheels, a pair of front and rear drive wheels of vehicles.

<Structure of Ring Gear>

Therefore, the ring gear 14 of the constituent components of the above differential sub-assembly 1 is explained below. The ring gear 14 is of an annular shape. As shown in FIGS. 1 and 2, this ring gear 14 is formed as a helical or spiral gear provided, on its outer periphery, with teeth 16 which are formed obliquely with respect to a center axis direction of the ring gear 14 (in a lateral direction in FIG. 1). The ring gear 14 has an inner peripheral surface serving as a press-fitting surface 18 which is press-fitted on an outer peripheral surface 20 of the flange 12 and also fastened to the flange 12 by caulking. To be specific, as shown in FIG. 2, the flange 12 includes a caulking portion 22 at one end side (a left side in FIG. 2) in a center axis direction of the flange 12.

Figure 3:
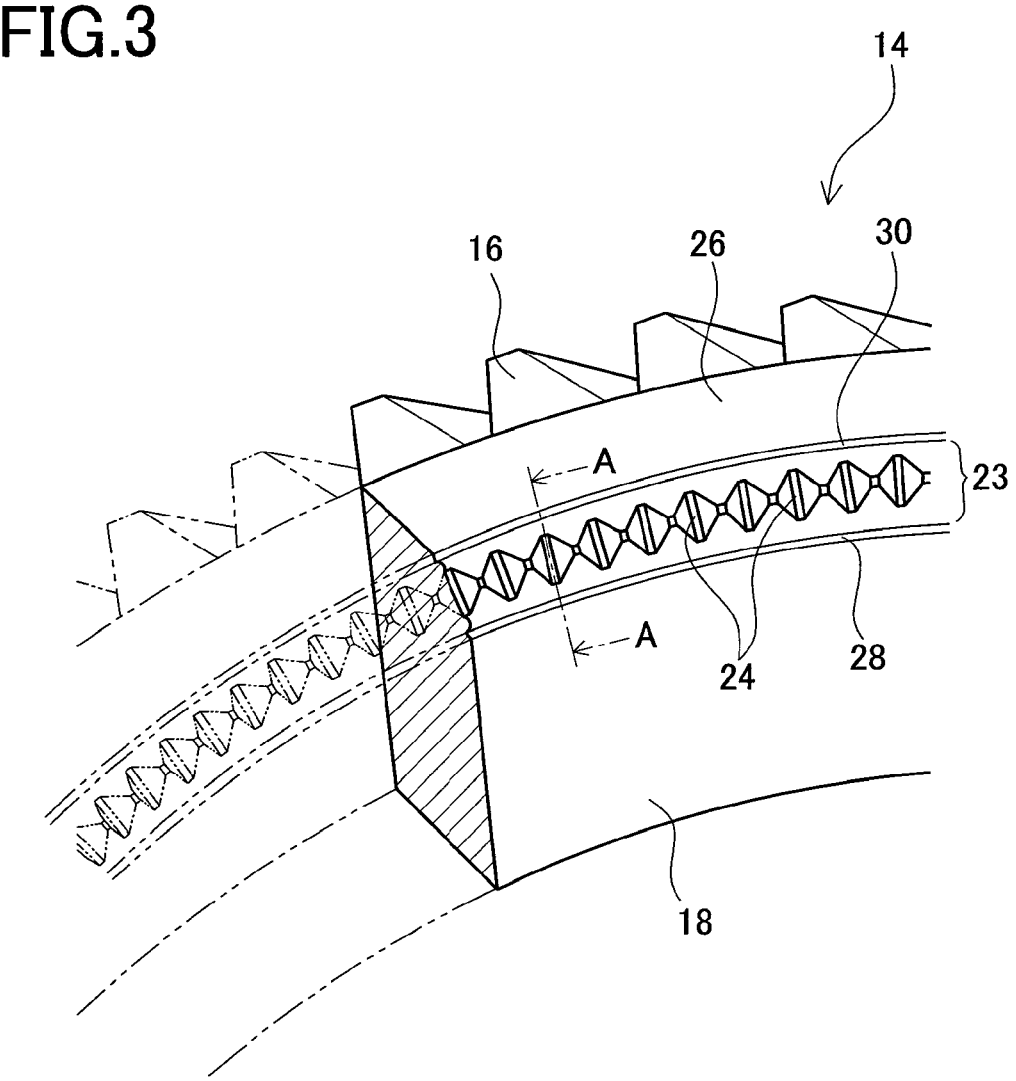
FIG. 3 is a perspective view showing an inner peripheral edge portion and its surroundings in the ring gear.
Figure 4:
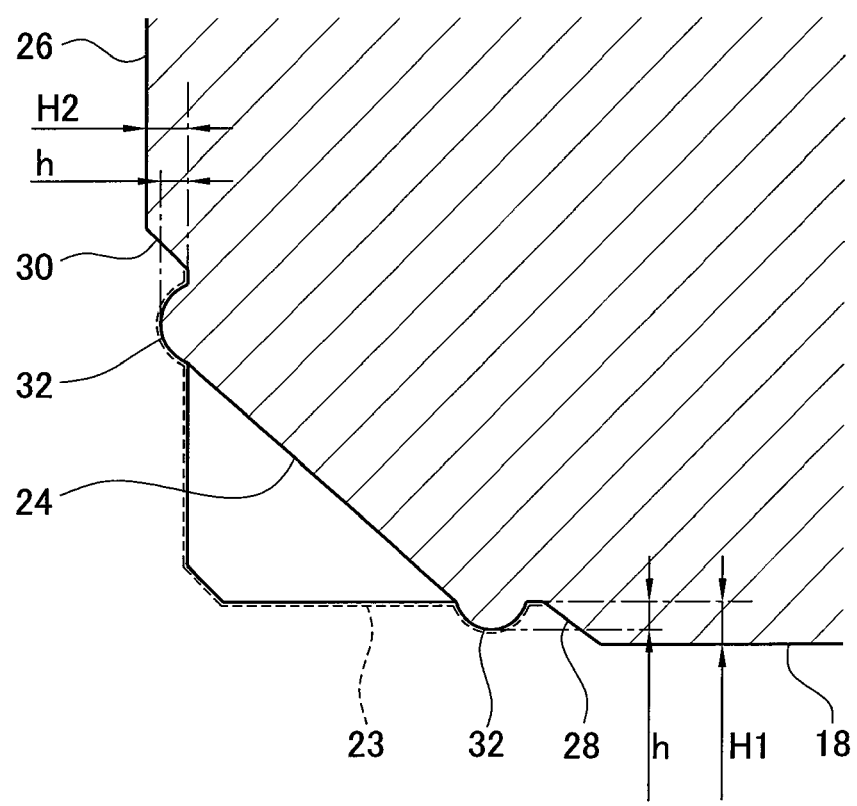
FIG. 4 is a sectional view taken along a line A-A in FIG. 3.

The ring gear 14 are provided with notches 24 in an inner peripheral edge portion 23 at one end side in the center axis direction as shown in FIGS. 3 and 4 so that the notches 24 are the caulked portions to be caulked with the caulking portion 22. The notches 24 are provided plurally at intervals in a circumferential direction of the ring gear 14. Each notch 24 is formed in a recessed shape when seen in the center axis direction of the ring gear 14 so that the bottom of the recessed shape is oblique to a radial direction (in a vertical direction in FIG. 4) and the center axis direction (in a lateral direction in FIG. 4) of the ring gear 14. FIG. 3 is a perspective view showing the inner peripheral edge portion 23 and its surroundings in the ring gear 14 and FIG. 4 is a sectional view taken along a line A-A in FIG. 3.

The notches 24 are each provided in the press-fitting surface 18 of the ring gear 14 through an inner-peripheral stepped portion 28 and in the end face 26 through an end-face stepped portion 30 as shown in FIG. 4. Specifically, the inner-peripheral stepped portion 28 is formed between the press-fitting surface 18 and the inner peripheral edge portion 23 (the notches 24) and outward from the press-fitting surface 18 in a radial direction of the ring gear 14. The end-face stepped portion 30 is formed between the end face 26 and the inner peripheral edge portion 23 (the notches 24) and from the end face 26 toward the other end side of the ring gear 14 in the center axis direction. Around each notch 24, there are protrusions 32 formed when the notches 24 are made by press working as mentioned later. In the present embodiment, a step amount H1 of the inner-peripheral stepped portion 28 in the radial direction of the ring gear 14 and a step amount H2 of the end-face stepped portion 30 in the center axis direction of the ring gear 14 are respectively determined to be larger the height h of each protrusion 32. More specifically, the step amount H1 corresponds to the width defined between the position of the inner peripheral surface 18 and the position of the inner peripheral edge portion 23 in the radial direction of the ring gear 14, while the step amount H2 corresponds to the width defined between the position of the end face 26 and the position of the inner peripheral edge portion 23 in the center axis direction of the ring gear 14.

<Method of Manufacturing Ring Gear>

Figure 5:
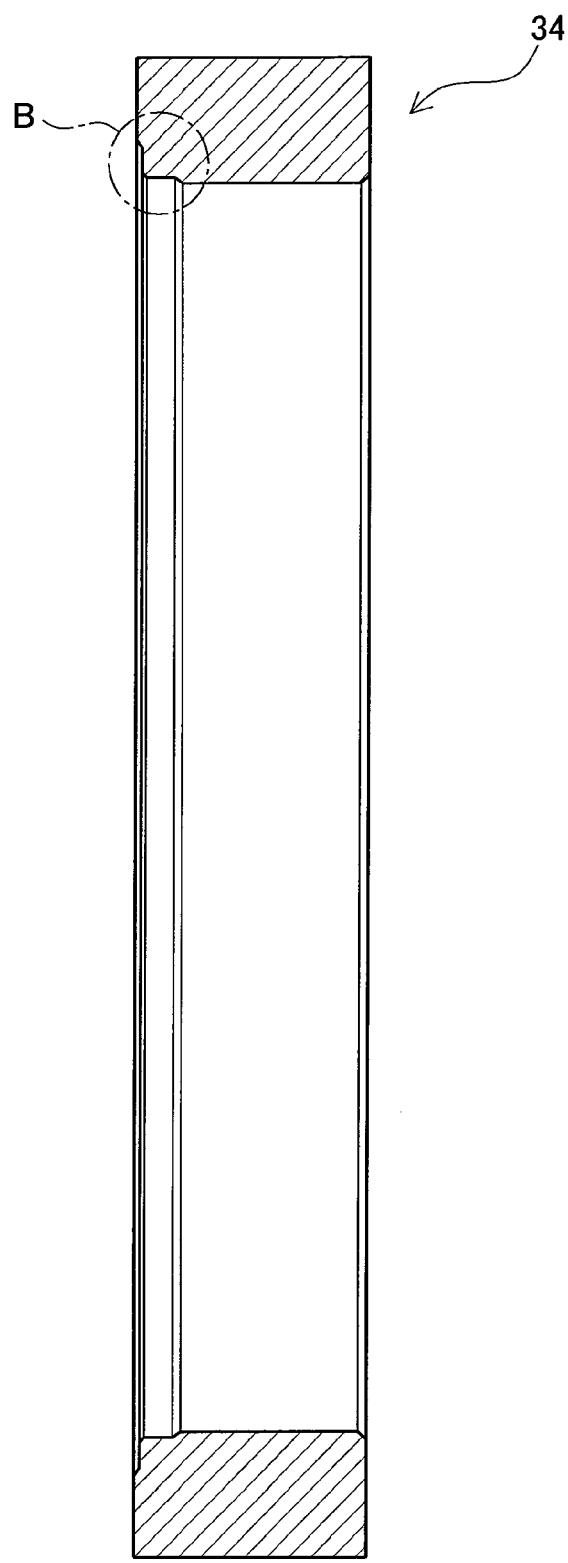
FIG. 5 is a sectional view of an unprocessed material in a present embodiment.
Figure 6:
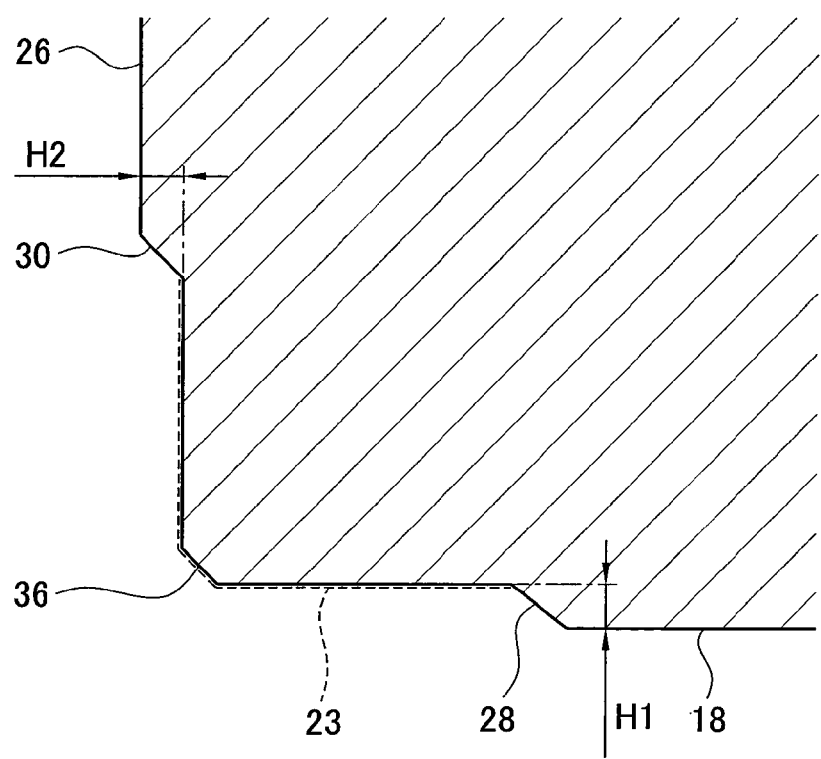
FIG. 6 is an enlarged sectional view of an inner peripheral edge portion and its surroundings in the unprocessed material of FIG. 5.

A method of manufacturing the ring gear 14 will be explained below. In a process of forming an unprocessed material, firstly, an annular unprocessed material 34 as shown in FIG. 5 is produced, which is an unprocessed or basic material of the ring gear 14. This unprocessed material 34 is provided with the inner-peripheral stepped portion 28 on the press-fitting surface 18 side which is the inner peripheral surface and the end-face stepped portion 30 on the end face 26 side which is one end side of the end faces in the center axis direction as shown in FIG. 6. In other words, the inner-peripheral stepped portion 28 is formed between the press-fitting surface 18 and the inner peripheral edge portion 23 and outward from the press-fitting surface 18 in the radial direction of the ring gear 14. Further, the end-face stepped portion 30 is formed between the end face 26 and the inner peripheral edge portion 23 and from the end face 26 toward the other end side in the center axis direction of the ring gear 14. In forming the unprocessed material 34, the step amount H1 of the inner-peripheral stepped portion 28 and the step amount H2 of the end-face stepped portion 30 are determined to be larger than the height h of each protrusion 32 to be formed in the press working process which will be mentioned later. It is easy to form the inner-peripheral stepped portion 28 and the end-face stepped portion 30 in the inner peripheral edge portion 23 of the unprocessed material 34. This process has no influence on costs. FIG. 5 is a sectional view of the unprocessed material 34 in the present embodiment. FIG. 6 is an enlarged view showing the inner peripheral edge portion 23 and its surroundings (indicated by a sign B in FIG. 5) in the unprocessed material 34 in the present embodiment.

In a press working process, subsequently, the notches 24 are formed by press working. Specifically, a press molding die is pressed, with a predetermined load, against the inner peripheral edge portion 23 of the unprocessed material 34 from one direction (a left direction in FIG. 5) of the center axis direction of the unprocessed material 34 to form the notches 24. At that time, a chamfered portion 36 (see FIG. 6) between the end face 26 and the press-fitting surface 18 is pressed, thereby forming the notches 24 as shown in FIG. 4. Simultaneously, the constituent material of the unprocessed material 34 is pushed out from the forming portion of each notch 24. Thus, the protrusions 32 each protruding as a raised portion are formed around the notches 24 as shown in FIG. 4. In the present embodiment, as mentioned above, the step amount H1 of the inner-peripheral stepped portion 28 and the step amount H2 of the end-face stepped portion 30 are determined to be larger than the height h of each protrusion 32 to separate the protrusions 32 from the press-fitting surface 18 and the end face 26.

As above, since the protrusions 32 are apart from the press-fitting surface 18 in the center axis direction and apart from the end face 26 in the radial direction, the end face 26 and the press-fitting surface 18 are not influenced by the protrusions 32 when the ring gear 14 is fastened to the flange 12 of the differential case 10. Accordingly, there is no need to perform a cutting process of removing the protrusions 32 by cutting the press-fitting surface 18 and the end face 26 and a burr removing process of removing the burrs as explained in the related art. It is therefore possible to reduce the manufacturing cost of the ring gear 14 and hence reduce the manufacturing cost of the fastening structure between the ring gear 14 and the differential case 10.

Since the protrusions 32 are apart from the press-fitting surface 18, variations in press-fitting load from product to product among the ring gears 14 can be reduced. Since the protrusions 32 are also apart from the end face 26, even when the caulking portion 22 of the differential case 10 and the end face 26 of the ring gear 14 are brought in contact with each other after caulking, their line contact or surface contact, not point contact, can be achieved. Accordingly, during rotation of the differential case 10 and the ring gear 14, stress disperses in contact portions of the caulking portion 22 of the differential case 10 and the end face 26 of the ring gear 14, and the differential case 10 and the ring gear 14 are maintained as being fastened.

When the notches 24 are to be formed by press working, the chamfered portion 36 formed in the inner peripheral edge portion 23 of the unprocessed material 34 as mentioned above allows the constituent material of the unprocessed material 34 to easily flow toward the press-fitting surface 18 side and the end face 26 side, thereby making it easy to form the notches 24.

After the above press working, a tooth-cutting process is performed to form teeth 16 on the outer peripheral surface of the unprocessed material 34. Subsequently, a heat treatment process is performed by carburization quenching and tempering. In the above way, the ring gear 14 is manufactured.

After the press working, the press-fitting surface 18 and the end face 26 may be subjected to cutting as needed in order to enhance accuracy of the press-fitting surface 18 and the end face 26. At that time, there is no need to cut out the protrusions 32 and thus continuous cutting is conducted. This reduces the occurrence of burrs, so that the burr removing process is no longer necessary. Further, the service life of a cutting tool used for the cutting can be improved.

<Method of Fastening the Ring Gear>

Figure 7:
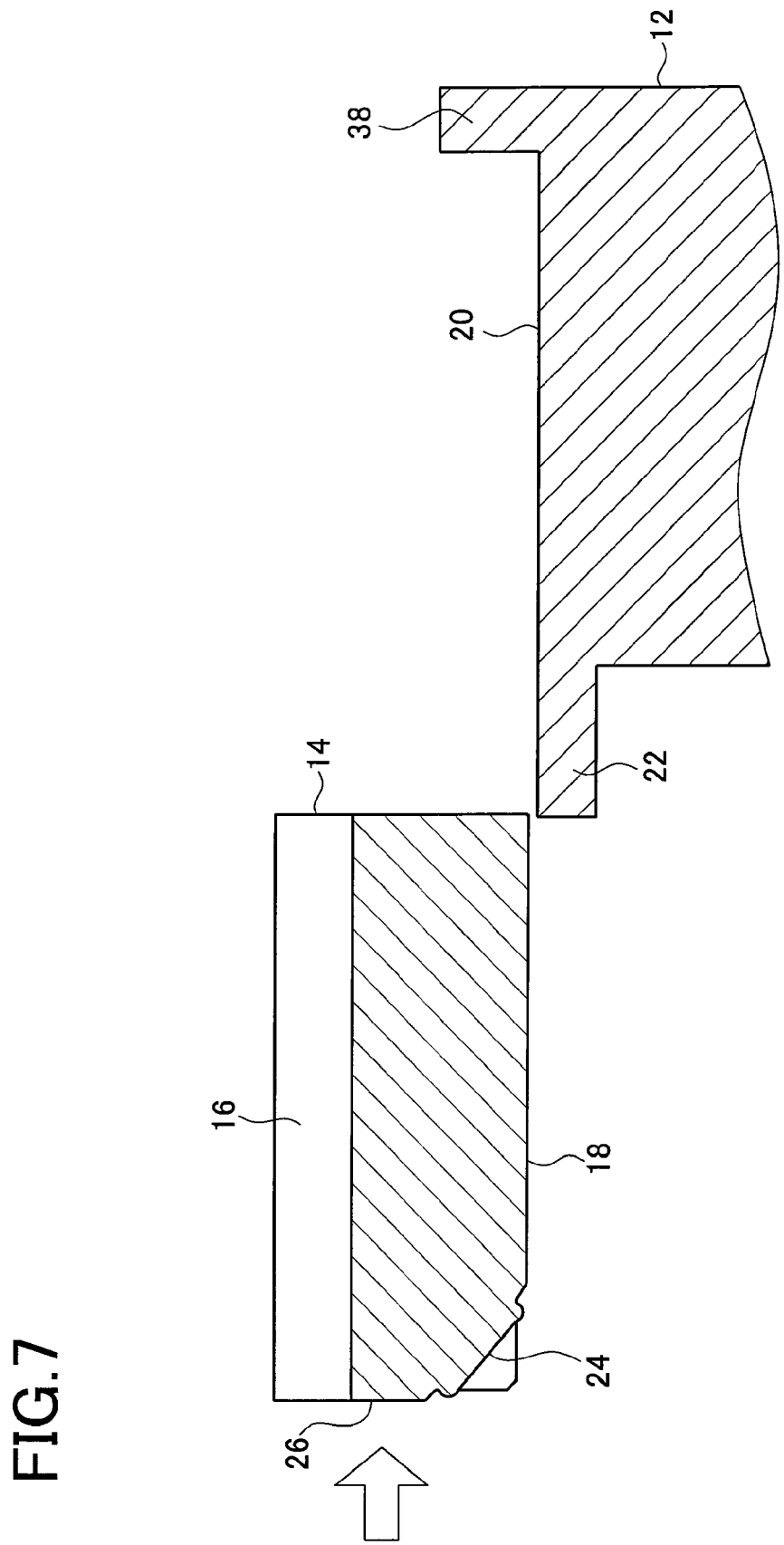
FIG. 7 is a schematic sectional view showing a press-fitting process.
Figure 8:
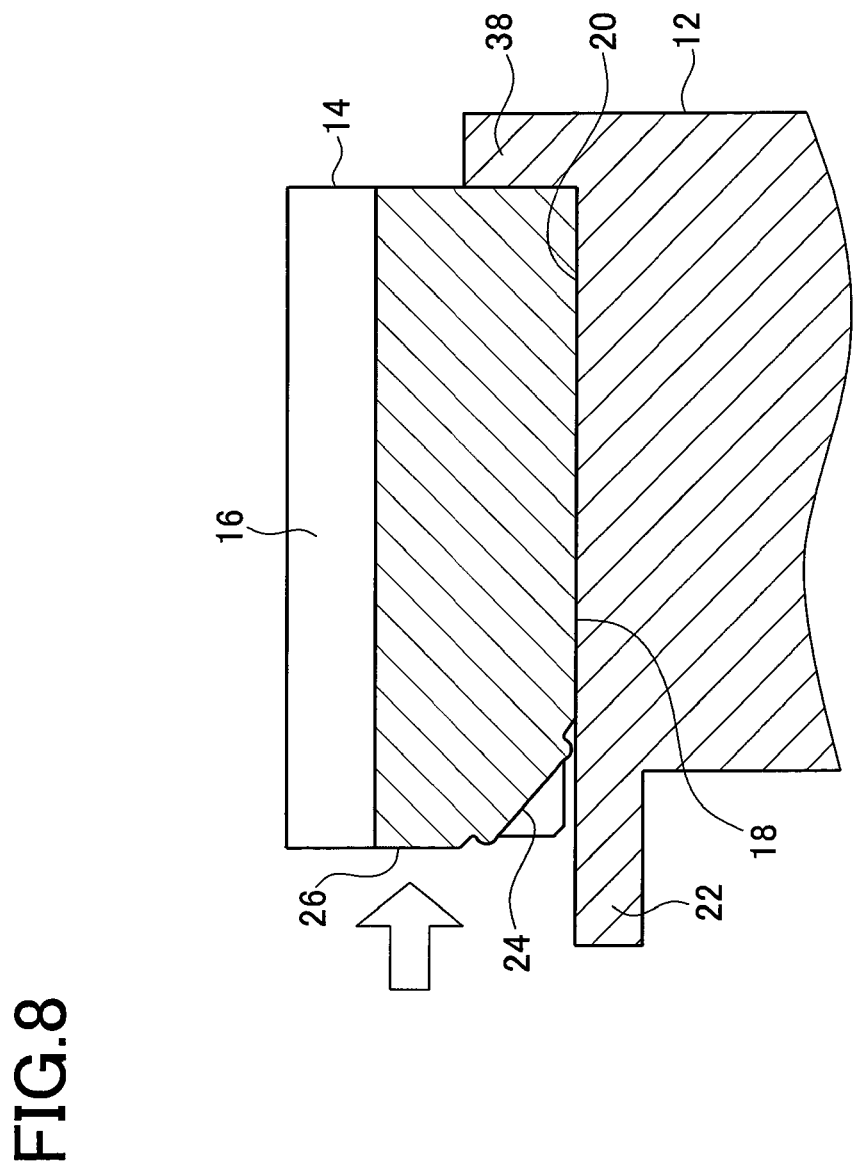
FIG. 8 is another schematic sectional view showing the press-fitting process.
Figure 9:
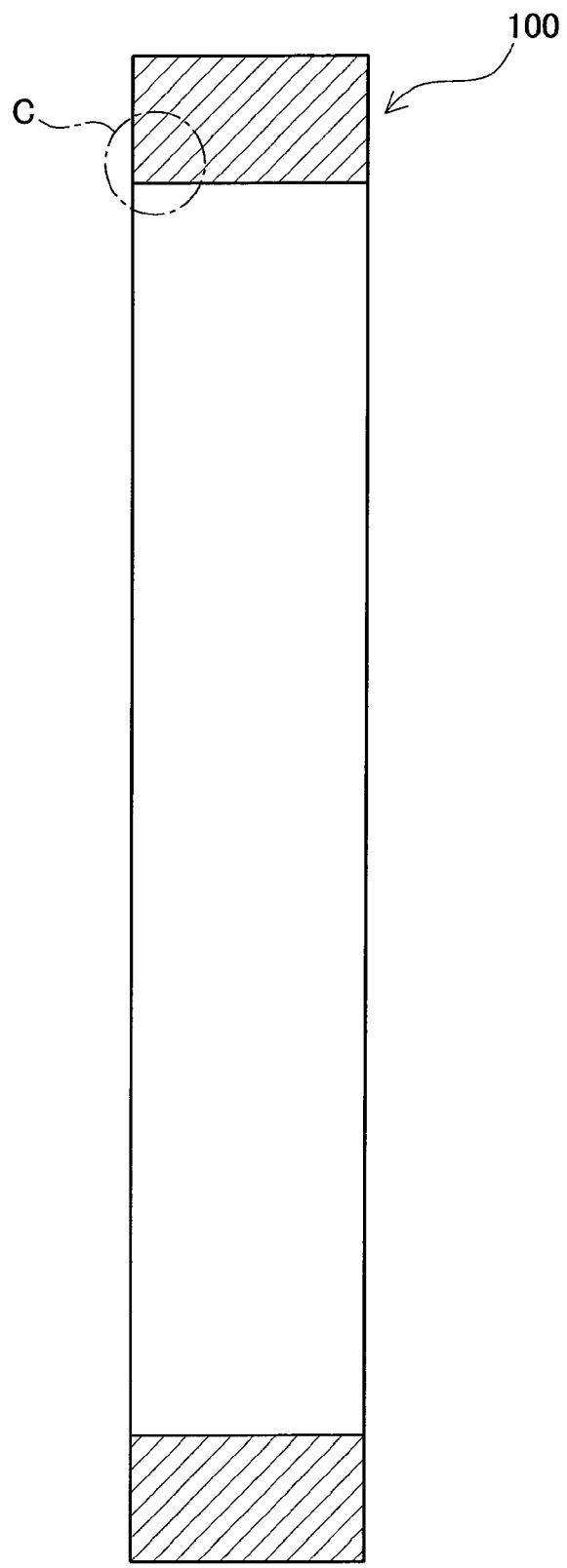
FIG. 9 is a sectional view of an unprocessed material in a related art.
Figure 10:
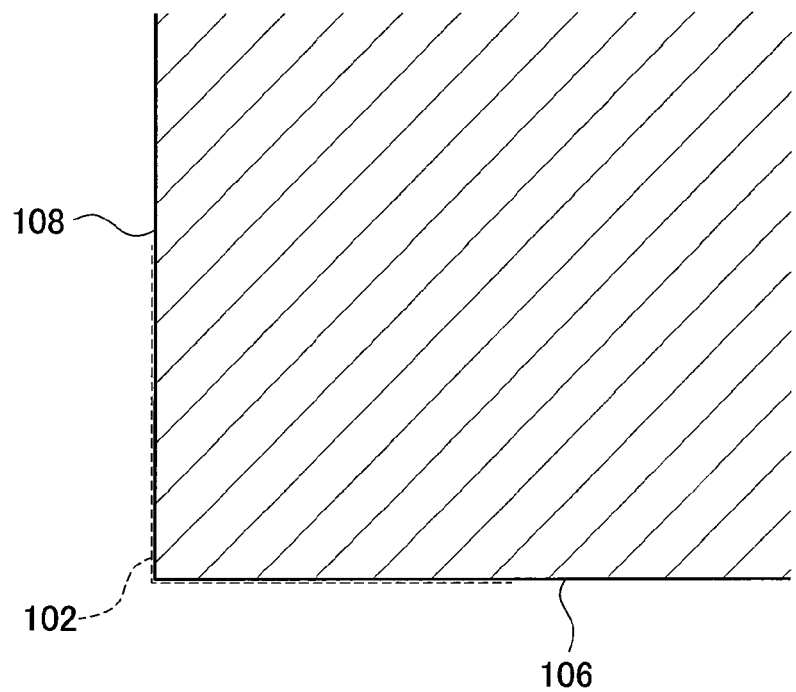
FIG. 10 is an enlarged sectional view of an inner peripheral edge portion and its surroundings in the unprocessed material of FIG. 9.
Figure 11:
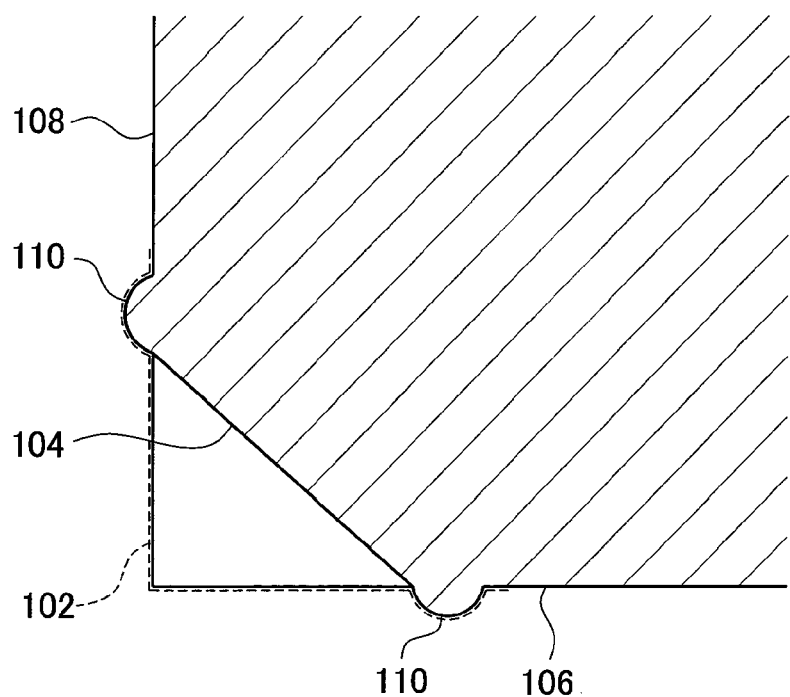
FIG. 11 is an enlarged sectional view of the inner peripheral edge portion and its surroundings in the unprocessed material in the related art after notches are formed.

A method of fastening the ring gear 14 manufactured as above to the differential case 10 will be explained below. FIGS. 7 and 8 are views to explain the method of fastening the ring gear 14 to the differential case 10.

In a press-fitting process, firstly, the ring gear 14 is press-fitted, through the press-fitting surface 18, onto the outer peripheral surface 20 of the flange 12 until the ring gear 14 contacts with a stopper 38 as shown in FIGS. 7 and 8. In this way, the flange 12 of the differential case 10 is placed inside of the press-fitting surface 18 of the ring gear 14. At that time, the caulking portion 22 of the flange 12 remains extending in parallel to the outer peripheral surface 20. In this state, the press-fitting surface 18 of the ring gear 14 is in close contact with the outer peripheral surface 20 of the flange 12.

In a caulking process, subsequently, the caulking portion 22 of the flange 12 is pressed against the notches 24 of the ring gear 14 to thereby fasten the ring gear 14. Specifically, the caulking portion 22 of the flange 12 is pressed to be widened, or deformed, from inside to outside in the radial direction of the ring gear 14 (from lower side to upper side in FIG. 8) by deformation processing. Thus, the caulking portion 22 of the flange 12 is pressed against the notches 24 of the ring gear 14, thereby fastening the ring gear 14, as shown in FIG. 2. The ring gear 14 is therefore fixed to the flange 12 by caulking. In the above manner, the ring gear 14 is fastened to the differential case 10.

When the protrusions 32 are caulked with the caulking portion 22 of the flange 12, the flange 12 of the differential case 10 and the ring gear 14 are fastened with larger fastening strength.

Effects of Present Embodiment

According to the present embodiment, the ring gear 14 includes the inner-peripheral stepped portion 28 formed between the press-fitting surface 18 and the inner peripheral edge portion 23 and outward from the press-fitting surface 18 in the radial direction and the end-face stepped portion 30 formed between the end face 26 at one end side in the center axis direction and the inner peripheral edge portion 23 and from the end face 26 toward the other end in the center axis direction. With this configuration, the protrusions 32 formed around the notches 24 by the constituent material of the unprocessed material 34 pushed out when the notches 24 are formed are less likely to have an influence on the differential case 10 to which the ring gear 14 is fastened. Accordingly, there is no need to perform the process of removing the protrusions 32, thus achieving a reduction in manufacturing cost of the ring gear 14. This can reduce the manufacturing cost of the fastening structure between the ring gear 14 and the differential case 10.

Further, because of the presence of the inner-peripheral stepped portion 28, it is possible to reduce variations in load from product to product among the ring gears 14 when the ring gears 14 are press-fitted respectively in the flanges 12 of the differential cases 10.

Since the protrusions 32 are apart from the press-fitting surface 18 in the center axis direction and also the protrusions 32 are apart from the end face 26 in the radial direction, the protrusions 32 are not likely to affect the differential case 10 to which the ring gear 14 is fastened. This eliminates the need for the process of removing the protrusions 32. Therefore, in case the press-fitting surface 18 and the end face 26 of the ring gear 14 are subjected to cutting using a cutting tool in order to enhance the accuracy of the press-fitting surface 18 and the end face 26, the service life of the cutting tool can be increased. Further, the manufacturing cost of the ring gear 14 can be effectively reduced.

Furthermore, the step amount H1 of the inner-peripheral stepped portion 28 and the step amount H2 of the end-face stepped portion 30 are determined to be larger than the height h of each protrusion 32. The protrusions 32 therefore do not have an influence on the flange 12 of the differential case 10 when the ring gear 14 is fastened to the flange 12 of the differential case 10. For this reason, the fastening strength of the fastening structure between the ring gear 14 and the differential case 10 can be enhanced.

Modified Example

In the aforementioned example, the ring gear 14 includes the inner-peripheral stepped portion 28 and the end-face stepped portion 30. As a modified example, it is conceivable to adopt a ring gear including any one of the inner-peripheral stepped portion 28 and the end-face stepped portion 30. In this modified example, the protrusions 32 are arranged apart from only one of the press-fitting surface 18 and the end face 26. This ring gear in the modified example can also reduce the number of processes required to remove the protrusions 32. This can reduce the manufacturing cost of the ring gear 14 and hence the manufacturing cost of the fastening structure between the ring gear 14 and the differential case 10.

The aforementioned embodiment is a mere example and gives no limitation to the present invention. The present invention may be embodied in other specific forms without departing from the essential characteristics thereof.

DESCRIPTION OF THE REFERENCE SIGNS

1 Differential sub-assembly
10 Differential case
12 Flange
14 Ring gear
18 Press-fitting surface
20 Outer peripheral surface
22 Caulking portion
23 Inner peripheral edge portion
24 Notch
26 End face
28 Inner-peripheral stepped portion 30 End-face stepped portion
32 Protrusion
34 Unprocessed material
H1 Step amount
H2 Step amount
h Height

The invention claimed is:

1. An annular caulking-fastened component to be fastened to a counterpart component, the caulking-fastened component comprising:
  a notch formed in an inner peripheral edge portion at one end side in a center axis direction, the notch being to be caulked to the counterpart component by caulking; and
  at least one of an inner-peripheral stepped portion formed between an inner peripheral surface and the inner peripheral edge portion and outward from the inner peripheral surface in a radial direction and an end-face stepped portion formed between an end face at one end side in the center axis direction and the inner peripheral edge portion and from the end face toward the other end side in the center axis direction, and
  a protrusion exists around the notch, the protrusion having been formed when a constituent material of unprocessed material is pushed out to form the notch.

2. The caulking-fastened component according to claim 1, wherein
  the protrusion is apart from at least one of the inner peripheral surface and the end face,
  for having the protrusion away from the inner peripheral surface, the protrusion is formed apart from the inner peripheral surface in the center axis direction, and
  for having the protrusion away from the end face, the protrusion is formed apart from the end face in the radial direction.

3. The caulking-fastened component according to claim 2, wherein a step amount of the inner-peripheral stepped portion and a step amount of the end-face stepped portion are each determined to be larger than height of the protrusion.

4. The caulking-fastened component according to claim 1, wherein
  the counterpart component is a differential case of a differential device, and
  the caulking-fastened component is a ring gear to be fastened to the differential case.

* * * * *